Oct. 13, 1964  R. S. DICKINSON  3,152,666
HYDRAULIC DAMPERS
Filed Nov. 22, 1963
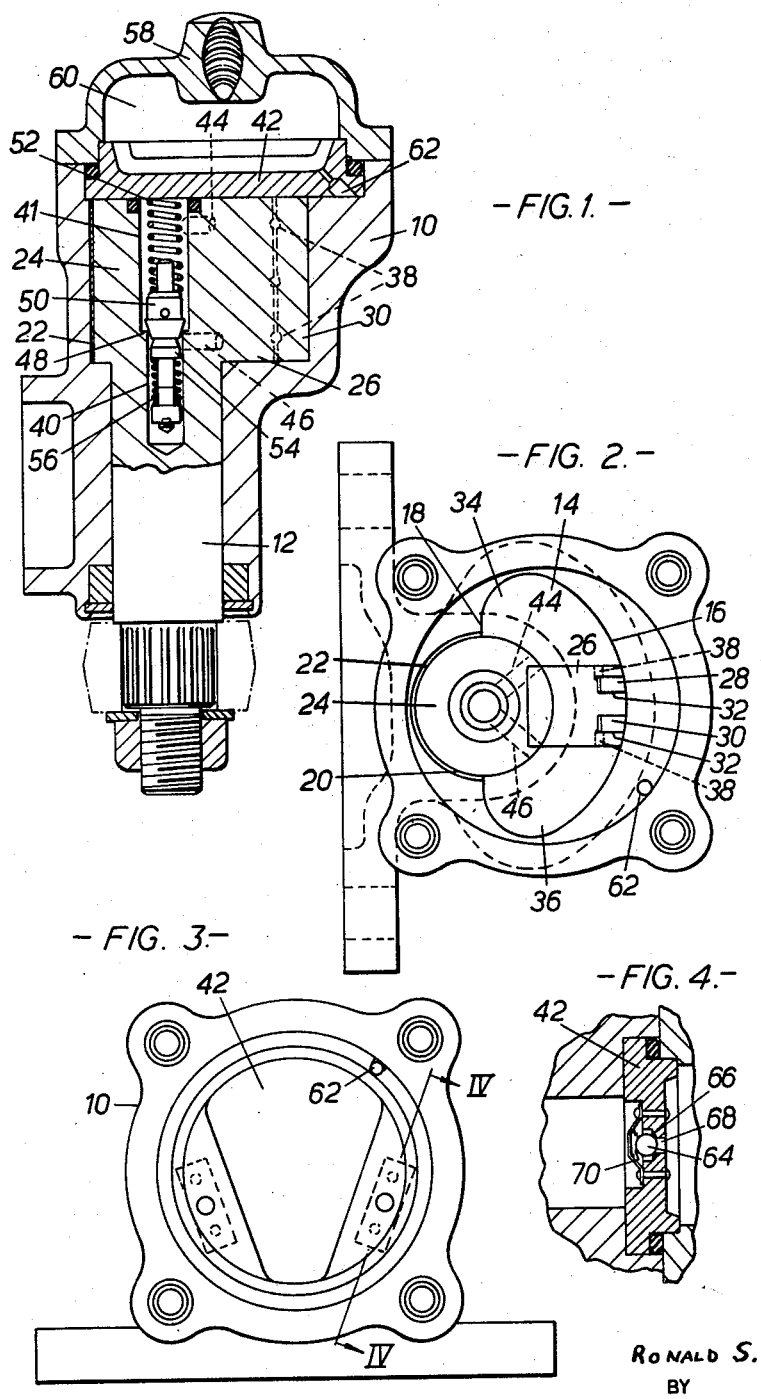
INVENTOR:
RONALD S. DICKINSON
BY
Bruner, Schuyler & Burridge
ATTORNEYS

United States Patent Office 3,152,666
Patented Oct. 13, 1964

3,152,666
HYDRAULIC DAMPERS
Ronald S. Dickinson, York, England, assignor to Armstrong Patents Co. Limited, London, England, a British company
Filed Nov. 22, 1963, Ser. No. 325,543
Claims priority, application, Great Britain, Nov. 24, 1962, 44,532/62
8 Claims. (Cl. 188—93)

This invention concerns hydraulic dampers, especially for use in vehicle steering assemblies.

Due to such circumstances as slight wheel unbalance, it is sometimes found that vehicle steering assemblies are subjected to relatively high frequency vibrations which it is desirable to damp in order to keep them within safe limits. The invention seeks to provide for this purpose, a hydraulic damper which is capable of being embodied within a vehicle steering assembly so as to form an integral part thereof.

According to the present invention, a hydraulic damper comprises a body member provided internally with a closed hydraulic chamber which is bounded partly by a cylindrical wall and partly by a non-cylindrical wall, the axial parallel edges of said cylindrical wall respectively merging into the cooperating edges of said non-cylindrical wall, a rockable spindle extending into said chamber axially relative to said cylindrical wall, said spindle being laterally supported in said chamber by said non-cylindrical wall and having one end externally of said chamber journalled in said body member, a vane carried at the other end and radially of said spindle within said chamber and having its radailly outer end in sealing engagement with the cylindrical wall portion of said chamber thereby to divide said chamber into two compartments of complementarily variable volume, passage means in said spindle or in said body member for hydraulically interconnecting said two compartments and including fluid flow restricting means, a hydraulic reservoir in said body member and a fluid flow path between said reservoir and the bearing clearance around said spindle for returning to said reservoir, any hydraulic medium forced under pressure from said complementary compartments into said clearance. Thus, by securing the body member to the vehicle chassis or frame, the damper proposed by the invention may be incorporated within a steering assembly in place of the usual idler box.

The fluid flow restricting means is preferably a two-way, coaxial valve arranged in an axial bore of the spindle, and may be pre-set to required adjustments and concealed in said bore, where it is inaccessible and safe from subsequent undesirable alteration; radial ports being formed in the spindle to place the bore in communication with the two compartments of the hydraulic chamber.

Preferably the radially outer end of the bore is provided with seals for engaging the part-cylindrical wall of the hydraulic chamber responsive to the pressures prevailing in said compartment. In conjunction with the cross-sectional shape of the hydraulic chamber, this arrangement enables the body member to be die-cast as opposed to machined, with consequent advantages in economy of manufacture.

The invention will be described further, by way of example, with reference to the accompanying drawings, in which:

FIG. 1 is an axial section through one steering damper embodying the invention;

FIG. 2 is a plan view thereof, with the top cover and valve plate removed for clarity;

FIG. 3 is a plan view with the valve plate in position; and

FIG. 4 is a section taken on the line IV—IV of FIG. 3.

In the steering damper shown in the drawings, a body member 10 has a rockable spindle 12 journalled at its lower end therein and extending into a hydraulic chamber 14 of the body member. The hydraulic chamber 14 which is of generally semi-circular or D-shaped cross-section has a cylindrical wall 16 and a plane wall 18 with the axially parallel edges of the wall 16 respectively merging into the co-operating edges of the wall 18. The plane wall 18 is formed with a part-cylindrical recess 20 provided with a sleeve bearing 22 and the inner end of the spindle has an enlarged diameter boss 24 having an axial length generally commensurate with that of the hydraulic chamber 14. The recess 20 and sleeve bearing 22 are coaxial with the cylindrical wall 16 of the chamber 14 and the boss 24 carries a radial vane 26 having a pair of close-spaced, parallel sealing strips 28, 30 in its radially outer end. Each of the sealing strips 28, 30 is of generally rectangular section and is received as a sliding fit in a recess provided for it in the outer end of the vane 26, the recesses being indicated at 32, and each recess 32 is radially slightly deeper than the sealing strip which it houses. The sealing strips 28, 30 are engageable with the cylindrical wall 16 of the chamber 14, whereby the vane 26 divides the chamber 14 into a pair of hydraulic compartments 34, 36 of complementarily variable volume, and each recess 32 is connected by one or more ports 38 with a respective one of the compartments 34, 36. As a result of this arrangement, whenever the vane 26 turns, the seal 28 or 30 which is adjoining the compartment 34 or 36 of momentarily decreasing volume is subjected at its rear face to the increased hydraulic pressure in that compartment, ensuring an efficient hydraulic sealing action against the cylindrical wall 16 even should some wear of the sealing strip have occurred; while the other seal, since it adjoins the compartment which is of increasing volume, is subjected at its rear face to a reduced pressure which causes it to withdraw into its recess, thereby reducing the frictional engagement with the chamber wall and keeping wear of the seal to a minimum.

At its upper end region, the spindle 12 is formed with an axial blind bore 40 having a counterbored portion 41 at its outer end which is closed by a valve plate 42. The bores 40 and 41 communicate via radial ports 44 and 46 formed in the spindle with the compartments 34 and 36. The junction between the bore 40 and counterbore 41 constitutes a valve seat 48 against which a hollow valve closure member 50 having a conical valve face is urged by a spring 52. At its free end, the valve member 50 is also formed as a valve seat, and a second valve closure member 54 having a conical valve face is urged by a spring 56 against this last-mentioned valve seat. By appropriate adjustment of the springs 52, 56, the two valves are caused to offer equal resistance to the hydraulic flow in the two directions through the valve chamber constituted by the bore 40 and counterbore 41. Additionally, a limited rate of hydraulic flow is permited even before the valve members 50 and 54 lift from their seats by radially notching said seats. It will be noted that, once the springs have been set to their required values and the valve assembly has been positioned in the valve chamber, the latter is closed by the plate 42, which thus renders the valve assembly inaccessible and tamperproof.

In the operation of the damper proposed by the invention, as the spindle 12 is oscillated relative to the body member 10, the vane 26 is correspondingly displaced in the hydraulic chamber 14. The presence of the double-acting damping valve assembly 48 to 56 in the spindle bores, however, restricts the amplitude of the applied oscillations, and should a sudden displacement of the spindle take place, then the valve members 50 and 54 will selectively lift from their seats to permit a momentarily greater rate of hydraulic flow between the compartments 34 and 36.

It is recognized in conventional hydraulic rotating vane apparatus that under circumstances where the vane is subjected to sudden displacements, danger to the spindle end seals can result from the relatively high hydraulic pressure generated in the hydraulic compartment which is decreasing in volume, and which is capable of expelling hydraulic medium from that compartment through the spindle working clearances. It has already been proposed, in this connection, to provide a bleed path from the spindle clearances to a region of low hydraulic pressure. Yet again, in a single-ended spindle construction such as that herein described, wherein full bearing support is provided only at one end of the spindle, the forces exerted on the vane during operation can cause the spindle axis to twist and to adopt skew positions, giving rise, at high hydraulic pressures, to considerable parasitic losses of hydraulic medium from the chamber 14 as the engagement of the vane seal or seals with the chamber wall deteriorates. These losses are of a variable and random nature, due to the random changes in the position of the spindle axis, and since any bleed path which may be provided is also dependent for its effect upon the spindle clearances and hence the instantaneous spindle position, it is difficult with any precision to predetermine a particular bleed path configuration. As a result, it has hitherto been considered necessary to provide a damping valve assembly which is capable of adjustment in its environmental position, but which consequently was open to tampering and possible wrong setting. The generally accepted method of minimising these several difficulties has been to adopt the most accurate manufacturing tolerances available, even though this resulted in relatively expensive manufacturing operations.

As shown more particularly in FIG. 1 of the drawings, the damper provided by the invention has a top cap 58 closing the end of the body member 10 remote from that at which the spindle 12 is introduced and which co-operates with the valve plate 42 to define a hydraulic reservoir 60. A bleed or relief passage 62 to the reservoir 60 is then provided at a position remote from the spindle clearances, specifically at a region of the cylindrical wall 16 of chamber 14 which is radially outwardly displaced relative to the free end of the vane 26. This produces, in co-operation with the spindle and vane clearances in the body member 10 and the vane clearance relative to the plate 42, a long and restricted bleed path which offers a comparatively high degree of hydraulic resistance to fluid flow and which thus exerts a substantial hydraulic damping action opposing attempts by the spindle to move out of its axial position. The hydraulic stability thus produced is further enhanced by the provision of a bearing at the inner end of the spindle, that is to say, the sleeve bearing 22, which will be seen to be of a so-called wrap-around configuration. By virtue of this high degree of hydraulic stability, it thus becomes relatively simple to predetermine both the required settings of the damping valves 48 to 56 and also the optimum shape of the bleed hole, one advantage of which, as already mentioned, is that the damping valves can be pre-set and then concealed in the spindle bores 40 and 41 by the plate 42. It will be further appreciated that the hydraulically stable nature of the damper structure thus achieved, together with the provision of the pressure responsive, displaceable sealing strips 28 and 30 and the part-circular cross-sectional shape of the chamber 14 all co-operate to widen the manufacturing tolerances necessary in the production of the damper, and in fact it is found possible to die-cast the body member 10 with the chamber 14 already formed to its working dimensions, thus greatly simplifying and reducing the expense of production.

In order to compensate for such hydraulic losses as may occur from the hydraulic chamber 14, and to avoid cavitation, one or more recuperation valves are provided between each of the compartments 34, 36 and the reservoir 60. As shown in FIGS. 3 and 4, the recuperation valves are carried by the valve plate 42, and each consists of a valve ball 64 urged against a valve seat 66 surrounding a passage 68 in the plate 42 by means of a spring 70.

When the damper provided by the invention is incorporated in a vehicle steering assembly in place of the conventional idler bearing usually employed, transverse shocks generating from the vehicle road wheels or other sources of transverse vibrations are damped or cushioned as also is steering wobble resulting from such causes as tire wear, and are thus not transmitted up the steering column with unpleasant and dangerous effects to be felt at the steering wheel. Deterioration of the steering column assembly due to such vibrations is also substantially reduced, with a resulting increase in vehicle safety. Moreover, since the internal components of the damper work in hydraulic medium, lubrication of the damper, which is necessary with conventional idler bearings, is eliminated. The damper is particularly useful in modern, low friction steering assemblies which employ low friction, greaseless steering joints, and efficiently prevents the transmission through such steering assemblies of road shocks and steering vibrations which, in the absence of proper damping, can reach objectionable proportions. It contributes significantly to the directional stability of the vehicle when travelling for example on a steep camber, or when subject to sudden side winds. In such circumstances, in the absence of or with inefficient damping, the vehicle steering characteristics abruptly change due to the transverse forces exerted on the steering assembly. With the damper of the present invention, however, the particular bleed path configuration employed between the vane and spindle clearances and the reservoir and the resulting high damping efficiency of the vane itself prevent the spindle and the steering assembly components connected thereto from following the force changes, that is to say, they exert a time lag or dashpot effect tending to mainain those components in their instantaneous position.

I claim:

1. A hydraulic damper comprising a body member provided internally with a closed hydraulic chamber which is bounded partly by a cylindrical wall and partly by a non-cylindrical wall, the axial parallel edges of said cylindrical wall respectively merging into the co-operating edges of said non-cylindrical wall, a rockable spindle extending into said chamber axially relative to said cylindrical wall, said spindle being laterally supported in said chamber by said non-cylindrical wall and having one end externally of said chamber journalled in said body member, a vane carried at the other end and radially of said spindle within said chamber and having its radially outer end in sealing engagement with the cylindrical wall portion of said chamber thereby to divide said chamber into two compartments of complementarily variable volume, a valve plate located within said body member transversely of the axial direction of said spindle, said damper being formed with a hydraulic reservoir which axially adjoins said hydraulic chamber and is separated therefrom by said valve plate, recuperation valve means in said valve plate for establishing fluid flow from said reservoir to said hydraulic chamber to replenish fluid loss from said compartments, passage means including fluid flow restricting means hydraulically interconnecting said two compartments, said damper being formed with a fluid flow path between said reservoir and the bearing clearance around said spindle for returning to said reservoir any hydraulic medium forced under pressure from said complementary compartments into said clearance, and pressure relief passage means connecting said reservoir with the junction between said valve plate and said body member at a region of said cylindrical wall radially outwardly of the end of said vane.

2. A hydraulic damper comprising a body member provided internally with a closed hydraulic chamber which is bounded partly by a cylindrical wall and partly by a non-cylindrical wall, the axial parallel edges of said cylindrical wall respectively merging into the co-operating edges of said non-cylindrical wall, a rockable spindle extending into said chamber axially relative to said cylindrical wall, said non-cylindrical wall being recessed, a cylindrical sleeve bearing in the recess for laterally supporting said spindle, said spindle having one end externally of said chamber journalled in said body member, a vane carried at the other end and radially of said spindle within said chamber and having its radially outer end in sealing engagement with the cylindrical wall portion of said chamber thereby to divide said chamber into two compartments of complementarily variable volume, and passage means including fluid flow restricting means hydraulically interconnecting said two compartments, said damper being formed with a hydraulic reservoir and with a fluid flow path between said reservoir and the bearing clearance around said spindle for returning to said reservoir any hydraulic medium forced under pressure from said complementary compartments into said clearance.

3. A hydraulic damper as set forth in claim 1, in which the spindle is formed with an axial bore and the fluid flow restricting means is a two-way valve arranged in said axial bore, said spindle being further formed with radial ports for respectively placing said bore in communication with said two hydraulic compartments, and wherein said valve comprises a first valve seat intermediate the ends of the spindle bore, a first valve closure member which has an axial passage through it and which is engageable with said first valve seat, a second valve seat surrounding said axial passage at the end of said first valve member which engages said first valve seat, and a second valve closure member engaging said second seat, said compartments being respectively connected to said bore at opposite sides of said valve seats.

4. A hydraulic damper as set forth in claim 1, comprising sealing means carried at the free end of said vane and displaceable by the hydraulic pressures prevailing in said compartments into fluid-tight engagement with said cylindrical wall.

5. A hydraulic damper as set forth in claim 4, wherein the free end of said damper is formed with a pair of axially directed, close-spaced, parallel recesses of rectangular section and each communicating with one of said compartments, and said sealing means comprises a pair of rectangular seals received one in each of said recesses.

6. A hydraulic damper as set forth in claim 5, wherein the body member is die cast.

7. A hydraulic damper comprising an at least partly hollow body member, a rockable spindle having one end journalled in said body member and extending at its other end into the hollow interior thereof, a valve plate located within the hollow interior of said body member transversely of the axial direction of said spindle and dividing said hollow interior into a closed hydraulic chamber and a hydraulic reservoir axially adjoining said hydraulic chamber, the inner end of said spindle terminating adjacent said valve plate, said hydraulic chamber being of substantially semi-circular cross-section with the spindle located axially of the cylindrical wall of said chamber and said spindle being received within a part-cylindrical recess of the plane wall of said hydraulic chamber, a part cylindrical sleeve bearing in said recess for laterally supporting the spindle within said chamber, a generally radial vane carried by said spindle within said chamber and having its radial outer end terminating adjacent the cylindrical wall of said chamber, said vane dividing said chamber into two compartments of complementarily variable volume, a pair of close spaced parallel rectangular seals in said outer end of said vane and selectively displaceable against said cylindrical wall responsive to the hydraulic pressures in said compartments, pre-set, double-acting fluid flow restricting valve means concealed within said spindle and communicating with said two compartments for permitting controlled flow of hydraulic medium therebetween, recuperation valve means in said valve plate for establishing fluid flow from said reservoir to said hydraulic chamber to replenish fluid loss from said compartments and pressure relief passage means in said valve plate connecting said reservoir with the junction between said valve plate and said body member at a region of said cylindrical wall which is radially outwards of the outer end of said vane.

8. A hydraulic damper as set forth in claim 7, wherein the body member is die cast.

References Cited in the file of this patent
UNITED STATES PATENTS

| | | |
|---|---|---|
| 1,903,006 | McKee | Mar. 28, 1933 |
| 1,903,377 | Moorhouse | Apr. 4, 1933 |
| 2,060,554 | Chryst | Nov. 10, 1936 |
| 2,229,660 | Mayrum | Jan. 28, 1941 |
| 2,516,782 | Mayrum | July 25, 1950 |